P. F. TARNAWSKI.
PORTABLE SANITARY WATER CLOSET.
APPLICATION FILED MAR. 1, 1909.
971,803.
Patented Oct. 4, 1910.
3 SHEETS—SHEET 1.
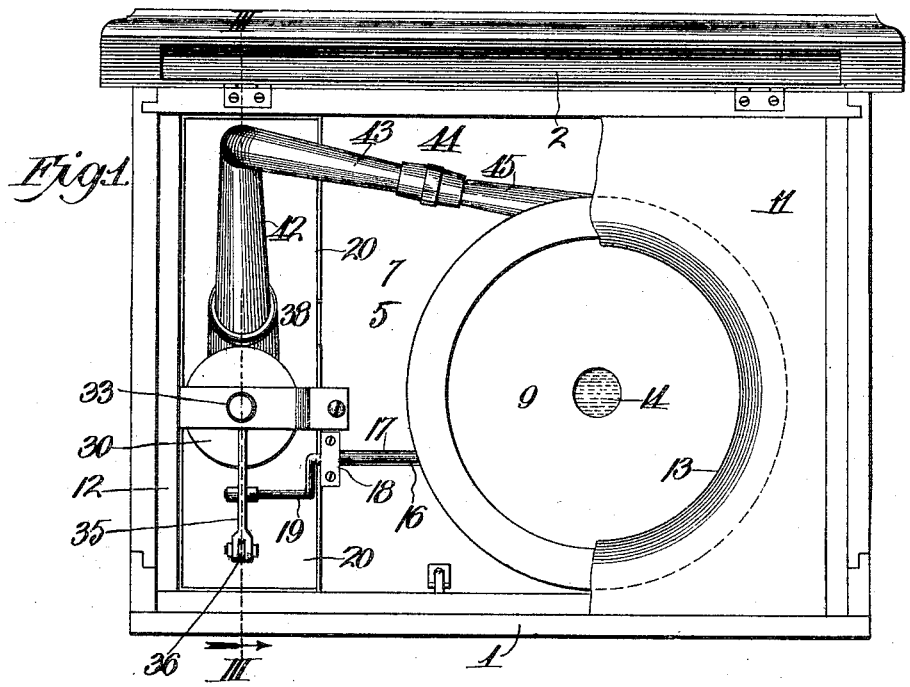
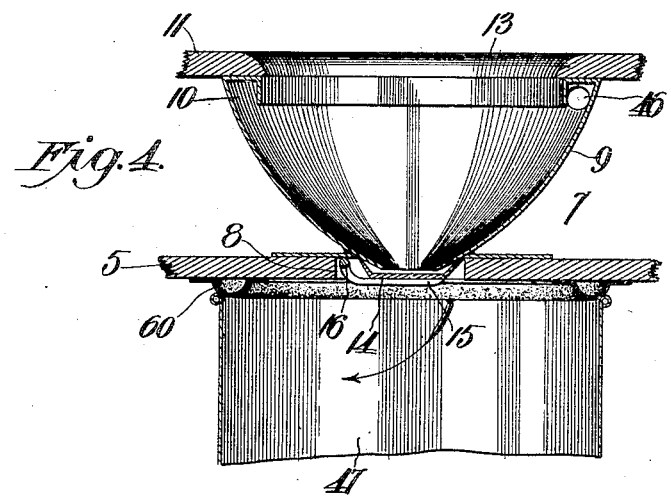

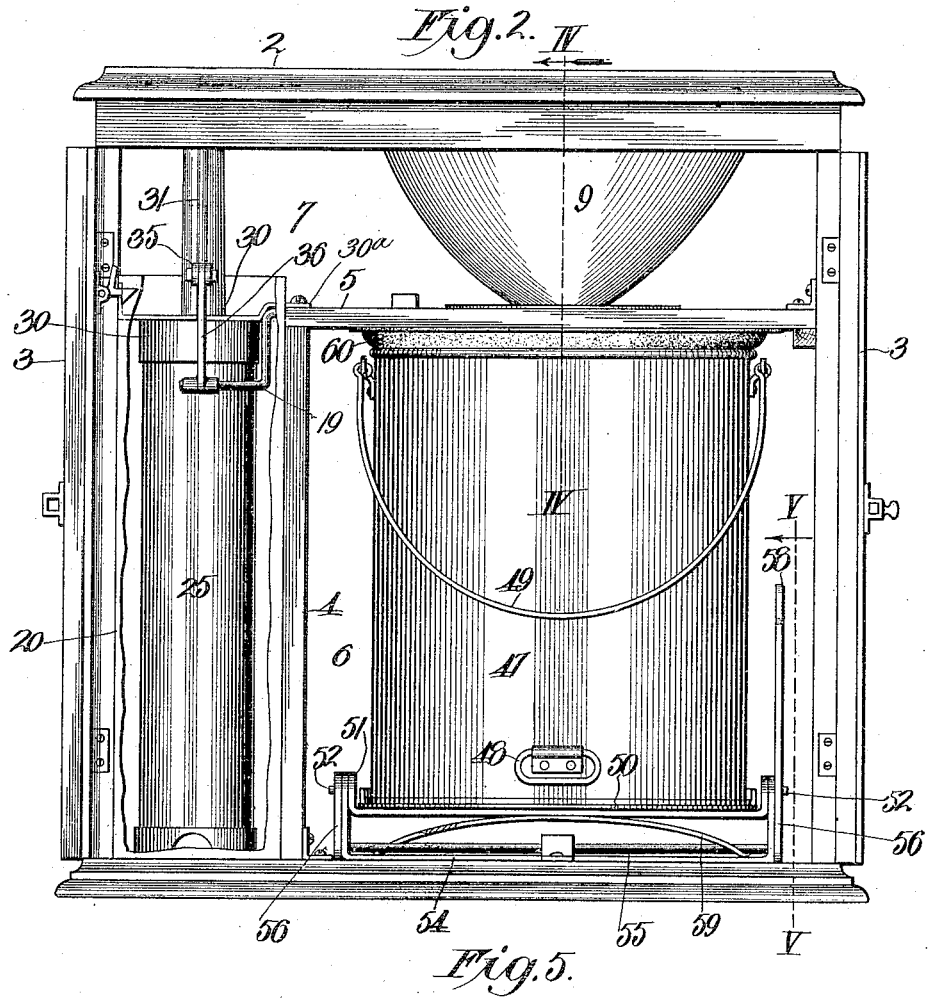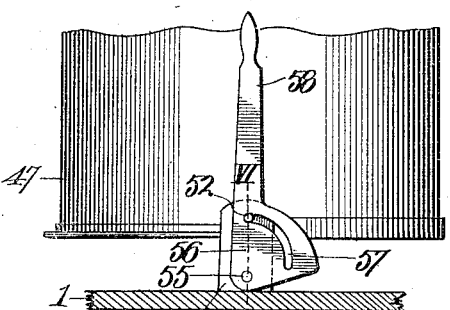

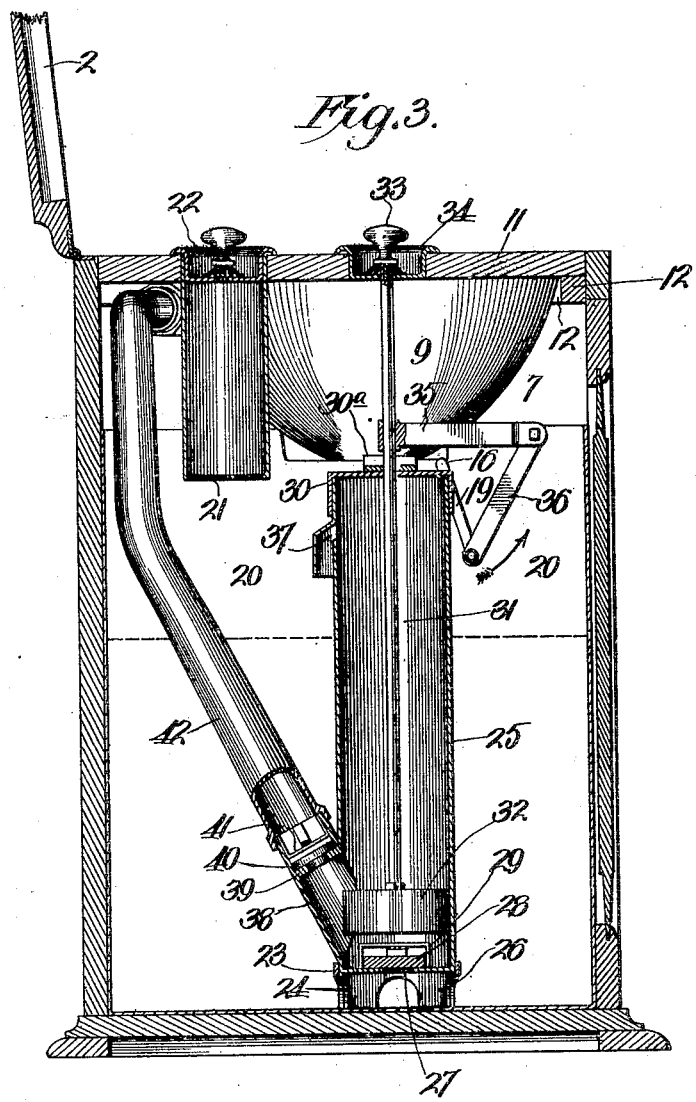

UNITED STATES PATENT OFFICE.

PETER F. TARNAWSKI, OF LEAVENWORTH, KANSAS, ASSIGNOR OF ONE-HALF TO PETER W. NICOLA, OF LEAVENWORTH, KANSAS.

PORTABLE SANITARY WATER-CLOSET.

971,803.

Specification of Letters Patent.

Patented Oct. 4, 1910.

Application filed March 1, 1909. Serial No. 480,782.

*To all whom it may concern:*

Be it known that I, PETER F. TARNAWSKI, a subject of Austria, residing at Leavenworth, in the county of Leavenworth and State of Kansas, have invented certain new and useful Improvements in Portable Sanitary Water-Toilets, of which the following is a specification.

This invention relates to portable sanitary water-toilets, and has for its object to produce apparatus of this character which after use can be readily flushed.

A further object is to produce apparatus of this character having a removable receiving-pail and means for automatically sealing the same.

A still further object is to produce means for simultaneously flushing the bowl and discharging the contents thereof into the pail. Another object is to produce means whereby the pail may be lowered from its sealed position to enable the attendant to remove and empty it.

A still further object is to produce apparatus of this character equipped with a tank capable of containing sufficient water to flush the bowl a large number of times and with means whereby said tank can be readily charged with water.

A further object is to produce apparatus of this character which is of ornamental appearance and which when not in use has the appearance of a cabinet.

With these objects in view and others as hereinafter appear, the invention consists in certain novel and peculiar features of construction and organization as hereinafter described and claimed; and in order that it may be fully understood reference is to be had to the accompanying drawings, in which—

Figure 1, is a top plan view of the apparatus with the lid raised and the seat broken away. Fig. 2, is a front view with the front doors open and the front wall of the tank broken away. Fig. 3, is a vertical section taken substantially on the line III—III of Fig. 1. Fig. 4, is a vertical section on the line IV—IV of Fig. 2. Fig. 5, is a section on the line V—V of Fig. 2. Fig. 6, is an enlarged section on line VI—VI of Fig. 5.

In the said drawings, 1 indicates a box or cabinet, preferably rectangular as shown, and provided with a hinged lid 2, and with a pair of doors 3.

4 and 5 indicate vertical and horizontal partitions, the former rising from the bottom of the box and arranged much nearer one side wall than the other, partition 5 being secured at its opposite end to the top of said partition and the side wall most remote therefrom, these partitions dividing the interior of the box into a chamber 6 and a chamber 7, the last-named chamber being at the opposite side of partition 4 from chamber 6, and overlying said chamber. Partition 5 is provided centrally with an opening 8, and depending therein and supported upon partition 5 is a bowl 9, formed at its upper edge with an annular internal downwardly-opening channel 10.

11 indicates a horizontal seat, which may be upholstered, if desired, and fits snugly in the box on cleats 12 and forms a closure for the chamber 7, and said seat rests lightly upon the top of the bowl and is provided with an opening 13, communicating with the same.

14 is a pan occupying opening 8, receiving the lower or discharge end of the bowl so that the pan may contain sufficient water to submerge said discharge end and form a water-seal for the same. The pan is carried by an arm 15 of a rock-shaft 16, extending transversely in a groove 17 in partition 5 and also through one or more bearings 18 carried by said partition, only one of the bearings being shown, and outward of the bearing shown, the rock-shaft is equipped with a crank 19, depending into a rectangular water-tank 20 occupying that part of chamber 7 at the opposite side of partition 4 from chamber 6, and in order to charge said tank with water, a filling tube 21 having a perforated bottom, depends through the seat 11 and is normally closed by a removable cap 22.

The tank is provided at its lower end with a socket 23 having perforations 24 to admit water, and fitting in said socket is a pump constructed as follows:—25 indicates the body or cylinder having a depending perforated circular flange 26 to fit in the socket and receive water admitted from the tank. The bottom of the body or cylinder is provided with an inlet port 27 normally controlled by a disk valve 28, a frame 29 maintaining the valve in operative relation to the port. The cylinder is provided with a cap 30 held against dislocation by an overlying guide-bar 30ª secured to partition 5 at one end and to the adjacent side wall at its opposite end, and slidingly extending through said cap and guide-bar is a piston rod 31, equipped at its lower end within the cylinder, with a piston 32, and at its upper end with a handle 33, the rod below the handle extending slidingly through a cap 34 closing an opening in the seat 11. The piston rod is also provided with a rigid arm 35 projecting forwardly above the cylinder and pivotally connected by a link 36 to crank 19, so that each time the piston is raised, said crank will be operated in the direction indicated by the arrow Fig. 3, and thus cause pan 14 to swing downward as indicated in Fig. 4, and leave the discharge end of the bowl unobstructed. The cylinder is provided above the water-line by preference, with an opening 37 through which water may escape back into the tank if it works above the piston and is lifted thereby to a sufficient height, and near its lower end is provided with an upwardly-extending spout 38 having a port 39 normally closed by a valve 40, a guard 41 being provided to guard against dislocation of the valve. 42 is a preferably metal tube receiving the upper end of spout 38, said tube extending upward to a point a suitable distance above the tank and then extending tangentially toward the rear portion of the grooved upper part of the bowl as at 43, the last-named portion being coupled by a union 44 or otherwise to a short pipe 45 communicating at its opposite end with an opening 46 in the wall of the bowl in the plane of the channel 10 thereof.

47 indicates a preferably metal pail provided with a hand loop 48 near its lower end, and a hinged bail 49 at its upper end, said pail resting upon a seat-plate 50 carried by a U-shaped frame 51 having outwardly projecting pins 52 engaging vertical slots 53 in the arms of the U-shaped frame 54 secured to the bottom of the box.

Journaled in arms 53 is a rock shaft 55 provided at its ends with crank arms 56 having eccentric or cam slots 57 receiving the ends of pins 52, and one of said crank arms 56 is equipped with a handle 58 which normally stands upright and which, when swung forward and downward, effects downward vertical movement of the slide frame 51, through the engagement of the cam slots 57 with pins 52, said downward movement being resisted by a spring 59 interposed between the stationary frame 54 and frame 51 as shown in Fig. 2, the parts being so arranged that when the lever has been swung down to a horizontal position the pressure on the spring cannot reëlevate it, though after the lever is raised slightly, the spring will continue its elevation. When the lever is down and the seat plate 50 is therefore depressed, the pail can be placed upon or removed from it readily and when the plate is elevated the upper edge of the pail is brought to bear firmly against a resilient ring-shaped cushion 60 secured to the underside of partition 5 concentrically surrounding opening 8 thereof, it being noticed that sufficient space is left between either side of chamber 6 and the pail-carrying mechanism to receive a lid to cover the pail when not engaged with the cushion. When the apparatus is not in use, the hinged lid 2 is down and the doors are closed, which doors are adapted, of course, to be latched in such position so as to guard against accidental opening, the latch mechanism of course forming no part of the invention. To use the device the lid 2 must be raised and after use the knob or handle 33 is pulled upward to raise the piston and thereby draw a charge of water from the tank into the pump, below the piston, the valve 28 moving upward to permit the water to enter through port 27. The elevation of the piston effects, through the instrumentality of arm 35, link 36 and crank 19, the operation of shaft 16 in the proper direction to swing pan 14 downward to a substantially vertical position so as to discharge its contents into the pail and leave the discharge end of the bowl unobstructed. The elevation of the plunger is instantly followed by downward pressure on the knob or handle to effect the depression of the plunger, and in this action the charge of water in the pump instantly reseats valve 28 and unseats valve 40 and is forcibly injected into the bowl from pipes 42 and 45, the direction of the water being such as to cause it to travel circularly around the interior of the bowl so as to flush the same. As the depression of the plunger is completed and before all of the water employed to flush the bowl has escaped therefrom, the pan is raised so as to receive the remaining water in the bowl and retain it, this volume of water being sufficient to submerge the lower extremity of the bowl and thus constitute a water seal between the bowl and pail.

The tank is of large capacity and can be made sufficiently large to contain water to provide for flushing operations for a week if desired, without the necessity of recharging and without requiring the apparatus to be of undue size. The pail is thoroughly sealed and therefore need not be emptied more than once a day, and when the attendant desires to empty said pail, the doors are opened and lever 58 swung down to lower the pail from engagement with cushion 60. The loop 48 and bail 49 are then grasped and the pail is drawn outward, the lid, not shown, for the pail being placed thereon. After being emptied the pail is of course thoroughly cleansed and then placed upon the depressed seat-plate, the lever being then operated to raise and effect the re-sealing of the upper end of the pail. The doors 3 are then closed and the lid 2 is lowered.

From the above description it will be apparent that I have produced an efficient and reliable apparatus of the character outlined which will be found of the utmost convenience in hospitals and in all houses not equipped with sewer connections, and even a convenience in modern houses in case of sickness.

I wish it to be understood of course that I do not desire to be restricted to the exact details of construction shown and described as obvious modifications will suggest themselves to one skilled in the art.

Having thus described the invention what I claim as new and desire to secure by Letters-Patent, is:—

1. An apparatus of the character described, comprising a cabinet having a seat provided with an opening, a bowl within the cabinet under said opening, movable means closing the discharge end of the bowl, a pail arranged below the bowl and said movable means, a vertically-movable seat-plate supporting the pail, a cushion for engagement with the upper end of the pail and adapted to form an air-tight connection with the same, means for moving said bowl-closing means aside, and means to hold said seat-plate elevated with a yielding pressure.

2. An apparatus of the character described, comprising a cabinet having a seat provided with an opening, a bowl within the cabinet under said opening, movable means closing the discharge end of the bowl, a pail arranged below the bowl and said movable means, a vertically-movable seat-plate supporting the pail, a cushion for engagement with the upper end of the pail and adapted to form an air-tight connection with the same, means for moving said bowl-closing means aside, means to hold said seat-plate elevated with a yielding pressure, and means to depress and hold the seat-plate in such position.

3. An apparatus of the character described, comprising a cabinet having a seat provided with an opening, a bowl within the cabinet under said opening, movable means closing the discharge end of the bowl, a pail arranged below the bowl and said movable means, a vertically-movable seat-plate supporting the pail, a cushion for engagement with the upper end of the pail and adapted to form an air-tight connection with the same, means for moving said bowl-closing means aside, a U-shaped frame resting on the bottom of the cabinet below the pail, and provided with vertical slots in its arms, pins projecting outward from the seat plate through said slots, a rock-shaft journaled in the U-shaped frame below said slots and provided with crank arms having eccentric slots receiving the outer ends of said pins, a spring exerting upward pressure on the seat-plate to raise the same and the pail when unopposed, and means to operate said rock-shaft and through the eccentric slots of its crank arms force said pins and the seat-plate downward against the resistance of said spring to effect the lowering of the pail.

4. An apparatus of the character described, comprising a cabinet having a seat provided with an opening, a horizontal partition below the seat and provided with an opening, a bowl within the cabinet under the opening of the seat and depending into the opening of the partition, a circular cushion secured to the underside of the partition concentrically around the opening thereof, a seat-plate, means for holding the same yieldingly elevated, a pail upon said seat plate and at its upper edge engaging said cushion with an air-tight relation when the seat-plate is elevated, and means to force the seat-plate downward and secure it in its depressed position.

In testimony whereof I affix my signature in presence of two witnesses.

PETER F. TARNAWSKI.

Witnesses:
PETER KLOSINSKI,
LOUIS H. WULFEKUHLER.